(12) United States Patent
Lefebvre Albaret

(10) Patent No.: US 11,803,956 B2
(45) Date of Patent: Oct. 31, 2023

(54) METHOD FOR DETECTING POTENTIAL DENTS IN A SURFACE ABLE TO REFLECT LIGHT, SYSTEM AND COMPUTER PROGRAM FOR THE IMPLEMENTATION THEREOF

(71) Applicant: Airbus Operations (S.A.S.), Toulouse (FR)

(72) Inventor: François Lefebvre Albaret, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 136 days.

(21) Appl. No.: 17/533,929

(22) Filed: Nov. 23, 2021

(65) Prior Publication Data
US 2022/0172343 A1 Jun. 2, 2022

(30) Foreign Application Priority Data
Nov. 27, 2020 (FR) ...................................... 2012237

(51) Int. Cl.
*G06T 7/00* (2017.01)
*B64F 5/60* (2017.01)
(Continued)

(52) U.S. Cl.
CPC .......... *G06T 7/0004* (2013.01); *B64C 39/024* (2013.01); *B64F 5/60* (2017.01);
(Continued)

(58) Field of Classification Search
CPC ......... G06T 7/0004; G06T 2207/10152; G06T 2207/30248; B64C 39/024; B64F 5/60;
(Continued)

(56) References Cited

U.S. PATENT DOCUMENTS

| | | | |
|---|---|---|---|
| 5,734,742 A | 3/1998 | Asaeda et al. | |
| 9,830,411 B2 | 11/2017 | Gnecco et al. | |
| 2016/0349746 A1 | 12/2016 | Grau | |
| 2019/0360941 A1* | 11/2019 | Ziltz | G01N 21/8806 |
| 2021/0056658 A1* | 2/2021 | Safai | G06T 1/0014 |

FOREIGN PATENT DOCUMENTS

| | | | | |
|---|---|---|---|---|
| CN | 206114549 | * | 8/2017 | |
| CN | 108414469 | * | 8/2018 | G01N 21/3504 |

(Continued)

OTHER PUBLICATIONS

French Search Report for Application No. 2012237 dated Jul. 12, 2021.
(Continued)

*Primary Examiner* — Jerome Grant, II
(74) *Attorney, Agent, or Firm* — KDW Firm PLLC

(57) ABSTRACT

A method for detecting potential dents in a surface includes providing a flying drone with an image acquisition device and a light source, the shape of which is elongate, and a data processing device. At least one series of images is acquired of portions of the surface by the image acquisition device by moving the flying drone past the surface along a trajectory so that, for each image of the series, the light source is illuminating the corresponding portion of the surface. The data processing device is operated to analyze the shape of a specular reflection of the light source in images of the series of images to estimate the position of any dents in the surface.

13 Claims, 9 Drawing Sheets

(51) Int. Cl.
*G06N 20/00* (2019.01)
*G06V 10/141* (2022.01)
*G06V 10/20* (2022.01)
*B64C 39/02* (2023.01)
*B64U 101/30* (2023.01)

(52) U.S. Cl.
CPC ........... *G06N 20/00* (2019.01); *G06V 10/141* (2022.01); *G06V 10/255* (2022.01); *B64U 2101/30* (2023.01); *G06T 2207/10152* (2013.01); *G06T 2207/30248* (2013.01)

(58) Field of Classification Search
CPC .... G06N 20/00; G06V 10/141; G06V 10/255; B64U 2101/30; B64U 10/13; B64U 30/20; G01N 21/8806; G01N 2201/0214; G01N 21/9515; G01N 21/8851; G01N 21/01; G01N 2021/0112
USPC ......................................................... 382/141
See application file for complete search history.

(56) References Cited

FOREIGN PATENT DOCUMENTS

| | | | | |
|---|---|---|---|---|
| CN | 109839366 | * | 8/2021 | |
| FR | 3 038 109 B1 | | 12/2016 | |
| JP | 2001 133409 A | | 5/2001 | |
| KR | 20070083407 | * | 8/2007 | ............. H01L 21/66 |
| KR | 2018-0057040 | * | 5/2018 | ............. G01N 21/88 |
| KR | 20180057040 | * | 5/2018 | ............. B64C 39/02 |
| WO | WO 2020/021191 A1 | | 1/2020 | |

OTHER PUBLICATIONS

Anonymous, "Laser Triangulation Sensors", Mechanical Technology, Incorporated, http://web.archive.org/20170119173248/https://mtiinstruments.com/technology-principles/laser-triangulation-sensors/, Jan. 2017.

* cited by examiner

METHOD FOR DETECTING POTENTIAL DENTS IN A SURFACE ABLE TO REFLECT LIGHT, SYSTEM AND COMPUTER PROGRAM FOR THE IMPLEMENTATION THEREOF

CROSS-REFERENCE TO RELATED APPLICATION

This application claims priority to French patent application number 20 12237 filed on Nov. 27, 2020, the entire disclosure of which is incorporated by reference herein.

TECHNICAL HELD

The disclosure herein relates to a method for detecting dents in a surface able to reflect light, such as the external surface (or skin) of an aircraft. Such dents may be caused notably by a falling object or by bird strike.

BACKGROUND

Dents in the external surface of an aircraft have conventionally been detected by visual inspection. In that case, the position of the dents is identified manually using measuring tools such as tape measures, with reference to visible structural elements such as frames, stringers or ribs that form the internal structure of the fuselage or of the wing.

Such an operation involves the intervention of numerous operators and is lengthy to perform, particularly in instances in which scaffolding has to be erected in order to access an upper part of the aircraft.

The use of drones equipped with telemetry devices for detecting and measuring dents in the external surface of an aircraft has also been proposed, in document FR3038109B1 (and its equivalent U.S. Pat. No. 9,830,411B2).

This method allows a considerable time-saving and a considerable cost reduction but requires precise a priori knowledge of the ideal (i.e. defect-free) geometry of the surface that is to be analyzed, and is not always able to achieve sufficient measurement precision.

SUMMARY

One subject of the disclosure herein is a method suitable for inspecting surfaces of large dimensions (for example several hundred square meters) which is efficient and quick to implement and which makes it possible to overcome, at least in part, the above-mentioned disadvantages. Another subject of the disclosure herein is a system and a computer program product allowing the implementation of such a method.

To that end, the subject matter herein discloses a method for detecting potential dents in a surface able to reflect light, comprising at least the following steps:
  A) Providing a system, comprising a flying drone equipped with an image acquisition device and at least one light source, the shape of which is elongate in the longitudinal direction of the light source, and a data processing device;
  B) Acquiring at least one series of images of portions of the surface by the image acquisition device by moving the flying drone past the surface along a trajectory so that, for each image of the series, the light source is illuminating the corresponding portion of the surface;
  C) Operating the data processing device so as to analyse the shape of a specular reflection of the light source in all or some of the images of the series of images so as to estimate the position of any dents in the surface.

In general, the method according to the disclosure herein allows surfaces of very large dimensions, for example several hundred square meters, to be analyzed in a particularly quick, effective and reliable way, without requiring precise prior knowledge of the shape of these surfaces.

Where it is desirable to do so, the method according to the disclosure herein allows all or part of analysis step C to be automated. When the ideal geometry of the surface that is to be inspected is known, at least roughly, the control of the flying drone can be performed entirely or partially in a programmed manner, so that it is also possible for step B of the method to be automated.

In some embodiments, for the series of images or for each series of images, the trajectory of the flying drone is such that an optical axis of the image acquisition device remains in a corresponding plane of section of the surface, and that the light source is in an orientation that is such that the longitudinal direction thereof is secant with the plane of section of the surface.

In some embodiments, step C comprises the following steps:
  C-I) For each image of the series of images, operating the data processing device so as to:
    c1) Identify the specular reflection of the light source in the image;
    c2) From the specular reflection identified in the preceding sub-step, estimate the median position, orthogonally to the longitudinal direction of the light source, of an ideal specular reflection of the light source in the image, corresponding to the median position of such a specular reflection in the absence of any dent in the surface;
    c3) Determine a distance between the flying drone and the surface;
    c4) Determine the position, on the surface, of each point of an origin of the specular reflection of the light source in the image;
    c5) Estimate a local gradient of the surface at each point of the origin of the specular reflection, at least from an estimate of any distance there might be between each point of the specular reflection of the light source in the image and the estimated median position of the ideal specular reflection;
  C-II) From all of the estimated local gradients obtained at the outcome of step C-I for at least one region of the surface, operating the data processing device so as to estimate the position of any dents there might be in the surface.

In some embodiments, in sub-step c3, the data processing device determines an apparent longitudinal extent of the specular reflection of the light source in the image, from which the data processing device deduces the distance between the flying drone and the surface.

In some embodiments, sub-step c4 comprises operating the data processing device so as to:
  determine, from the estimated median position of the ideal specular reflection in the image, an angle between the optical axis of the image acquisition device and a plane that passes through the optical center of the image acquisition device and which contains a median position of an origin of the ideal specular reflection of the light source off an ideal surface corresponding to the shape that the surface would have if free of dents;
  deduce therefrom the orientation, with respect to a reference plane, of the direction normal to the surface at any point of the origin of the specular reflection of the light source in a dent-free zone of the surface;

deduce therefrom a correspondence between each point of the image and each point of the corresponding portion of the surface.

In some embodiments, in sub-step c5, the data processing device determines a maximum boundary of a parameter representing the cumulative effect of the width of the light source and of a potential orange peel effect inherent to the surface on the specular reflection of the light source in the image from an estimate, made by the data processing device, of the width of the ideal specular reflection of the light source in the image.

In some embodiments, step C-II comprises operating the data processing device so as to determine, along different planes of section of the surface, corresponding profiles of the local gradient which are compatible with the estimated local gradient obtained in step C, while at the same time minimizing a function indicative of the sum of the absolute values of the local gradients along each of the planes of section.

In some embodiments, step C-II subsequently comprises operating the data processing device so as to determine a dent profile by calculating, along each of the different planes of section of the surface, the integral of the previously determined corresponding profile of the local gradient.

In some embodiments, step C-II subsequently comprises operating the data processing device so as to form a map of the depth of at least part of the surface from the dent profiles previously determined for the different planes of section of the surface, and then identifying any zones with a depth greater than a predetermined threshold as dents in the surface.

In some embodiments, step C subsequently comprises a step C-I-bis interposed between step C-I and step C-II, which involves an operator or an artificial intelligence visually identifying one or more dents in the surface in the images acquired in step B and selecting one or more regions of the surface comprising the one or more dents, and wherein step C-II concerns itself only with these one or more regions.

The disclosure herein also relates to a system for detecting potential dents in a surface able to reflect light, comprising:
  a flying drone equipped with an image acquisition device and at least one light source, the shape of which is elongate in the longitudinal direction of the light source, and
  a data processing device configured to perform step C of the method of the type described above.

In some embodiments, the light source has a longitudinal extent greater than a span of an assembly made up of the flying drone apart from the light source and/or at least one-and-a-half times a maximum separation between rotors of the flying drone.

The disclosure herein also relates to a computer program product comprising program code instructions which, when they are executed by the data processing device of the system of the type defined above provided with a series of images of portions of a surface able to reflect light which have been acquired in accordance with step B of the method of the type defined above, result in the data processing device implementing step C of the method.

BRIEF DESCRIPTION OF THE DRAWINGS

The disclosure herein will be better understood, and further details, advantages and features thereof will become apparent from reading the following description given by way of non-limiting example and with reference to the attached drawings in which.

In all of these figures, identical references may denote elements that are identical or analogous.

DETAILED DESCRIPTION

Figure 16:
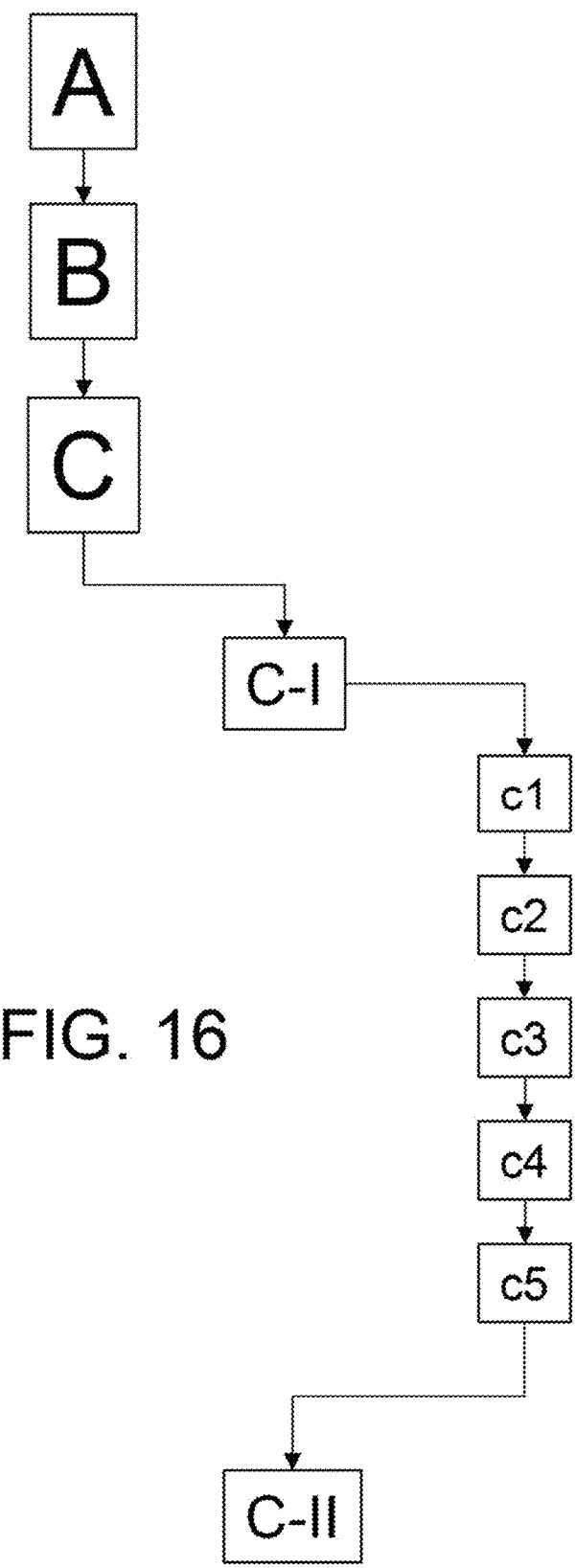
FIG. 16 is a flow diagram of the method according to a preferred embodiment of the disclosure herein.

A method for detecting dents in a surface able to reflect light, according to one embodiment of the disclosure herein, will now be described with continuous reference to the flow diagram of FIG. 16.

A first step A of this method comprises providing a system 10. The system 10, visible in FIGS. 1 to 3, comprising a flying drone 12 equipped with an image acquisition device 14 and with a light source 16, and a data processing device 18.

The image acquisition device 14 is, for example, a digital video camera or a digital still camera. The flying drone is, for example, a product available on the market incorporating the image acquisition device 14.

The light source 16 has a shape that is elongate, preferably longilinear, defining a longitudinal direction D thereof.

In the embodiment illustrated, the light source 16 consists of or comprises a longitudinal row of lighting elements 20, for example light-emitting diodes (LEDs) borne by—or integrated into—a support of a shape that is elongate in the longitudinal direction D, such as a bar or beam, fixed to a chassis 22 of the flying drone 12. As a variant, several longitudinal rows of lighting elements that are parallel may be provided. As a further variant, the light source 16 may consist of a single luminous element the shape of which is elongate in the longitudinal direction D, or of several lighting elements of this type parallel to one another. The light source 16, which is not very directional so as to allow it to illuminate surfaces that are to be analyzed, has a central direction of emission ED (FIG. 3) which is, for example, inclined downwards by an angle ψ of between 30 degrees and 60 degrees, for example of 45 degrees, with respect to a horizontal plane H of the flying drone 12. In the example illustrated, in which the flying drone 12 comprises coplanar rotors 24, the horizontal plane H is simply defined as being the plane of the rotors. More generally, the horizontal plane H is a plane corresponding to a possible attitude that the flying drone 12 may adopt when flying in hovering flight. The central direction of emission ED and the degree of openness of the light beam emitted by the light source 16 are chosen according to parameters of the method, notably the shape of the surface that is to be analyzed and of the mean intended distance between the flying drone 12 and such a surface during implementation of the method.

Figure 1:
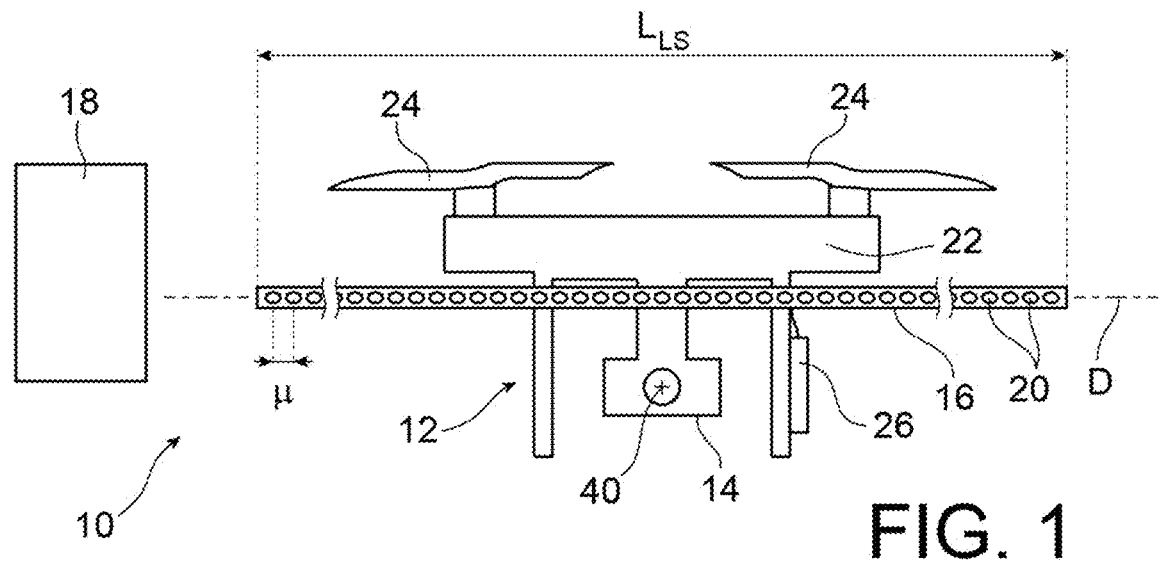
FIG. 1 is a schematic front view of a system for implementing a method for detecting potential dents in a surface able to reflect light, the system comprising a flying drone equipped with an image acquisition device and a light source, and a data processing device.
Figure 2:
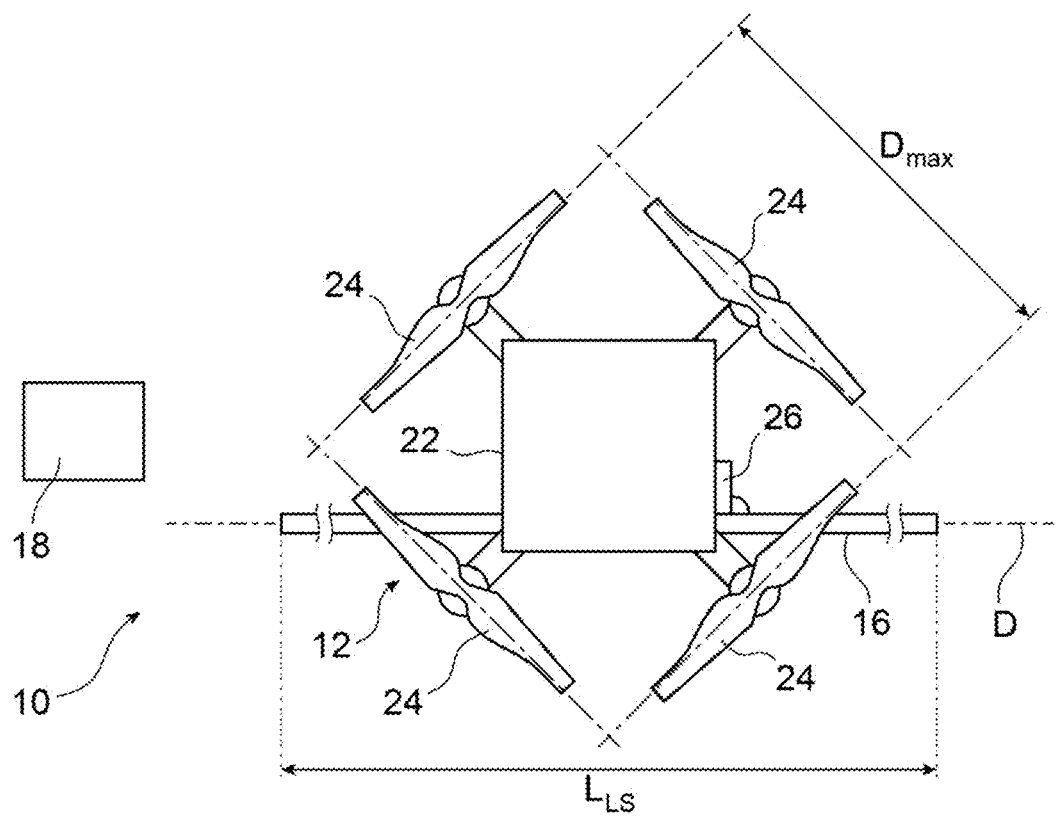
FIG. 2 is a schematic top view of the system of FIG. 1.
Figure 3:
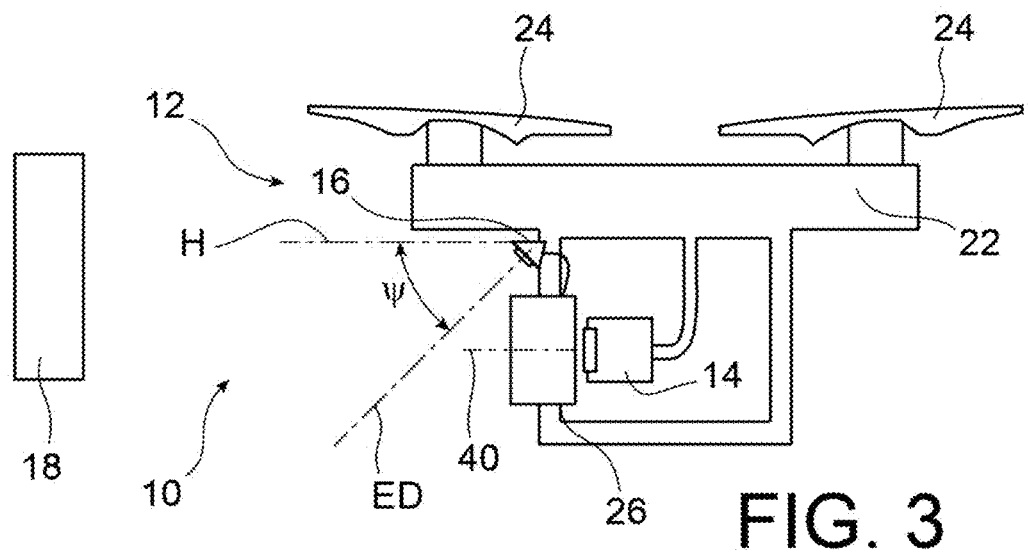
FIG. 3 is a schematic side view of the system of FIG. 1.

The light source 16 preferably has a longitudinal extent $L_{LS}$ greater than the span of an assembly made up of the flying drone 12 apart from the light source 16 itself and, for example, equal to 1 meter (FIGS. 1 and 2) or more. In some embodiments of the disclosure herein, this longitudinal extent $L_{LS}$ is at least equal to one-and-a-half times the maximum separation $D_{max}$ between the rotors 24 of the flying drone 12 (FIG. 2). A longitudinal extent $L_{LS}$ that is great in comparison with the aforementioned span optimizes the operational effectiveness of the method while at the same time limiting the size, and therefore the cost, of the flying drone 12, as will become more clearly apparent in what follows. The row of lighting elements 20 comprises, for example, a number of lighting elements such that the lighting elements 20 are spaced less than 30 centimeters (cm) apart pairwise, this spacing p preferably being less than 1 centimeter (FIG. 1). A high linear density of lighting elements allows good uniformity of illumination of the surface that is to be inspected. Of course, the choice of these parameters may be optimized, notably according to the dimensions of a surface that is to be inspected. In addition, a battery 26 is attached to the flying drone 12 so as to supply the light source 16 with electrical power (FIGS. 1-3).

Lastly, the data processing device 18 is a generic commercially available device such as a computer, a tablet or a smartphone, provided with a program designed to implement the method, or is an item of apparatus specifically designed for implementing the method according to the disclosure herein. In some embodiments of the disclosure herein, the data processing device 18 may be carried partially or fully on board the flying drone 12. In all cases, the data processing device 18 is able to exchange data with the image acquisition device 14 with which the flying drone 12 is equipped, for example via a wireless connection. The data processing device 18 may advantageously be designed to control the flight of the flying drone 12 or to interface with a control unit controlling the flying drone 12.

Figure 4:
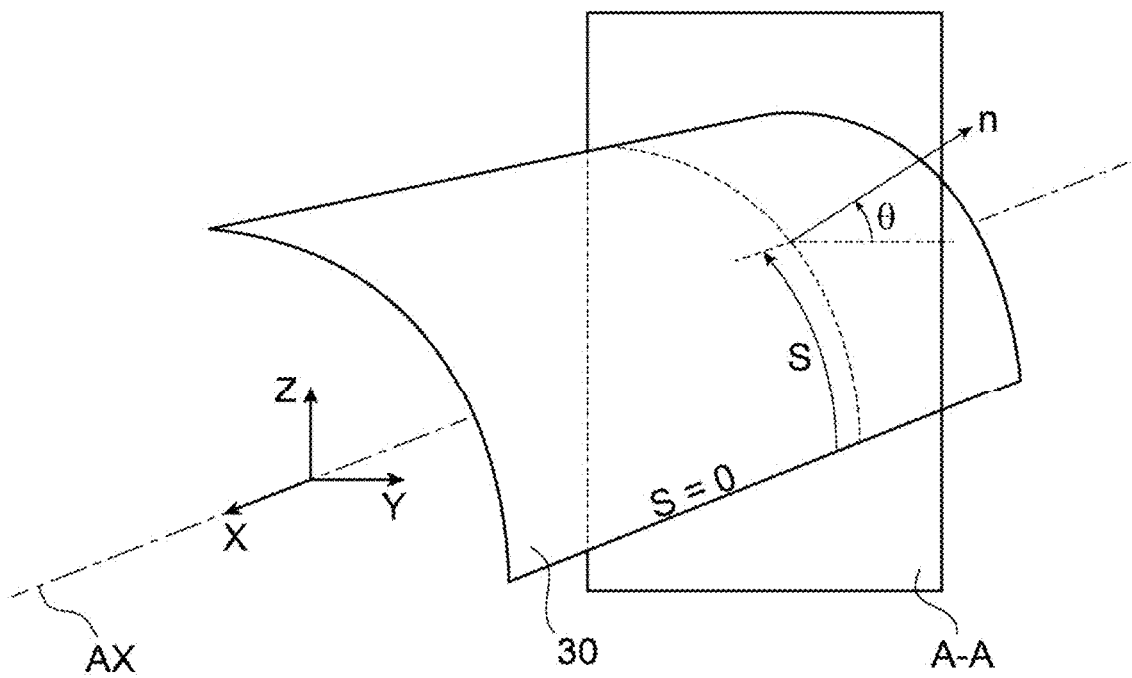
FIG. 4 is a schematic perspective view of a surface able to reflect light.

FIG. 4 illustrates part of a surface 30 to be inspected. The method according to the disclosure herein therefore becomes applicable when the surface 30 has enough gloss to allow a specular reflection of the light source 16 to be discerned in this surface. In this regard, the method is preferably applied to surfaces having a degree of specular gloss at least equal to 10% (within the meaning of standard ISO 2813). It should be noted that the method according to the disclosure herein can be applied to surfaces having an "orange peel effect", this effect being due for example to the type of paint with which such a surface may be coated, as will become more clearly apparent in what follows.

The disclosure herein is applicable to surfaces for inspection that exhibit varying geometries. However, in the context of the illustrated embodiment of the disclosure herein, the surface 30 that is to be inspected has, discounting any dents there might be, a geometry that is such that, in any plane of section orthogonal to a certain direction, the function θ(s) that determines the angle θ that the vector n normal to the surface at the abscissa point s makes with respect to a reference plane, such as a horizontal (X, Y) plane, defined with respect to an orthonormal reference system {X, Y, Z}, as a function of the curvilinear abscissa value s in the plane of section (FIG. 4), is a bijective function.

The surface 30 is thus a surface of cylindrical shape of circular cross section or, in a variant, a surface of cylindrical shape of elliptical or oval cross section, or more generally, of annular cross section that can be approximated locally by a cylinder of revolution. In this case, the plane or planes of section considered for implementing the method are preferably planes transverse to an axis AX of the surface, whereas the horizontal reference plane, for defining the angle θ and the curvilinear abscissa value s, contains the axis AX.

In one particular application of the method according to the disclosure herein, the surface 30 is the exterior surface of an aircraft, particularly the exterior surface of the fuselage of an aircraft.

In other embodiments of the disclosure herein, the surface 30 is a surface of conical shape, in which case the surface 30 is approximated locally by a cylinder of revolution for implementing the method.

With reference to FIGS. 5 to 8, the method according to the disclosure herein comprises a step B consisting in or comprising acquiring at least one series of images {I(1) ... I(n)} of portions P(1) ... P(n) of the surface 30 by the image acquisition device 14 by moving the flying drone 12 past the surface 30 along a trajectory T1 or T3 so that an optical axis 40 (FIGS. 5 and 7) of the image acquisition device 14 remains in a corresponding plane of section A-A of the surface 30 (for example the plane of section of FIGS. 6 and 7), and by keeping the light source 16 in an orientation that is such that the longitudinal direction D thereof is secant with the plane of section A-A and such that, for each image I(1) ... I(n) of the series, the light source 16 illuminates the corresponding portion P(1) ... P(n) of the surface. In the example illustrated, the light source 16 is kept in an orientation such that the longitudinal direction D thereof is orthogonal to the plane of section A-A.

Figure 5:
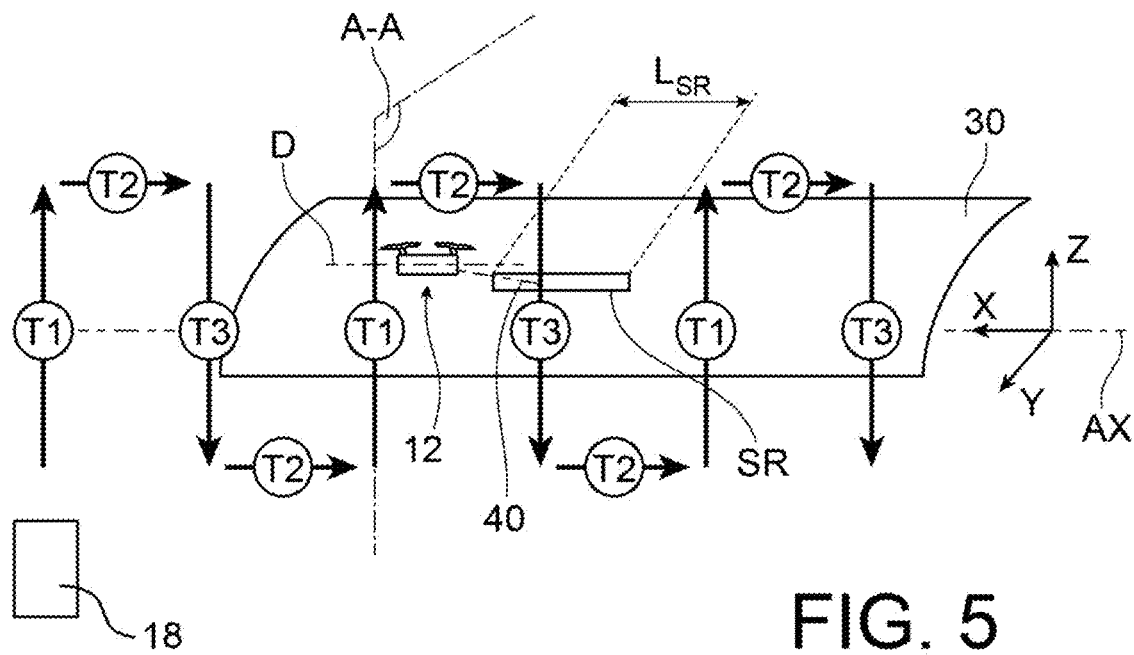
FIG. 5 is a schematic partial side view of the surface of FIG. 4 and of the system of FIG. 1, during the implementation of a step of the method consisting in or comprising acquiring at least one series of images of portions of the surface by the system.

In the preferred embodiment of the disclosure herein, the trajectory of the flying drone 12 during acquisition of a given series of images {I(1) ... I(n)} is a trajectory contained inside a plane of section A-A transverse to the axis AX of the surface 30.

Where applicable, with reference to FIG. 5, the overall trajectory of the flying drone 12 for the successive acquisition of several series of images comprises first trajectory portions T1 and T3 contained respectively in planes of section A-A transverse to the axis AX of the surface 30, and second trajectory portions T2 connecting pairs of first trajectory portions T1, T3, for example being oriented substantially parallel to the axis AX of the surface 30. With a view to effectiveness, the first portions T3 are covered in the opposite direction compared with the first portions T1 and are therefore performed in alternation with the latter.

Figure 8:
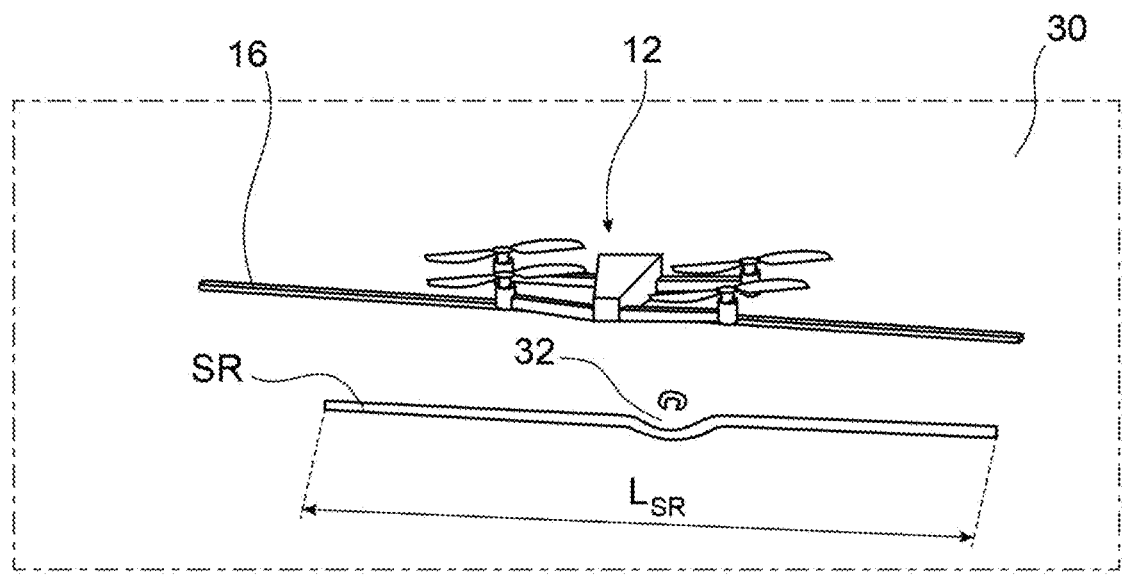
FIG. 8 is a schematic partial side view of the surface of FIG. 4 and of the system of FIG. 1, during the implementation of the step of the method corresponding to FIG. 5.
Figure 9:
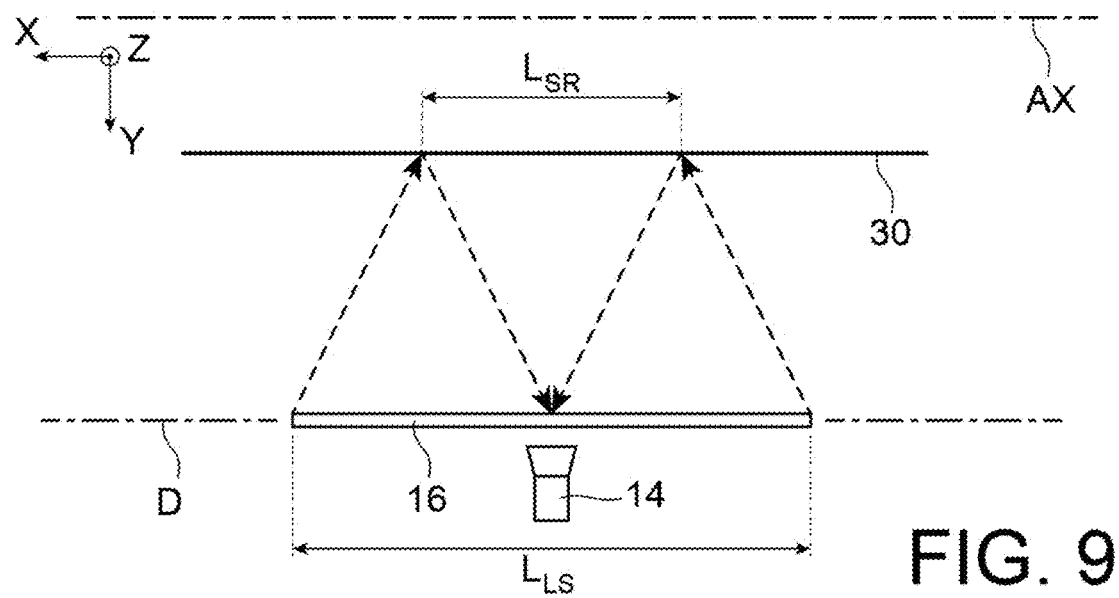
FIG. 9 is a schematic partial top view of the surface of FIG. 4 and of the system of FIG. 1, during the implementation of the step of the method corresponding to FIG. 5.

The planes of section transverse to the axis AX, in which planes the first trajectory portions T1 and T3 are defined, are spaced apart from one another by a distance smaller than or equal to the longitudinal extent $L_{SR}$, on the surface 30, of a specular reflection SR of the light source 16 seen by the image acquisition device 14 (FIGS. 5, 8 and 9). The specular reflection SR thus sweeps all of the surface 30 or of a region thereof.

The method further comprises a step C consisting in or comprising analyzing the shape of a specular reflection ISR of the light source 16 in all or some of the images of the series of images so as to estimate the position of any dents 32 in the surface 30, by the data processing device 18.

More specifically, step C comprises a step C-I that consists in or comprises or comprises, for each image I(1) . . . I(n) of the series of images (or of each series of images), operating the data processing device 18 so as to perform the following sub-steps c1 to c5.

Figure 10:
FIG. 10 is a partial view of an image of the series of images acquired during the step of the method corresponding to FIG. 5.

The first sub-step c1 consists in or comprises or comprises identifying a specular reflection of the light source 16 in the image (FIG. 10), for example by segmenting the latter.

Figure 11:
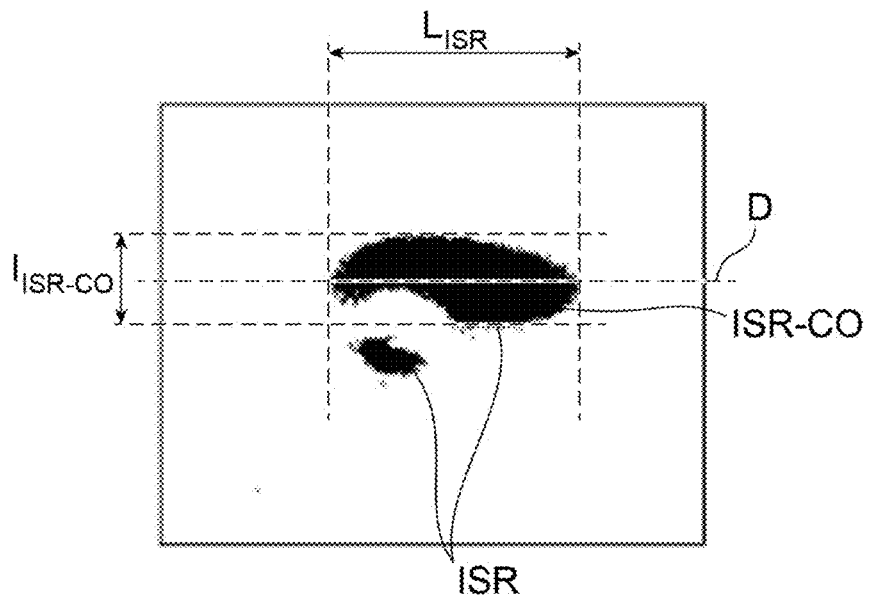
FIG. 11 is a view of the image of FIG. 10 after processing applied by the data processing device in the context of steps of the method.

To do this, the data processing device for example implements an adaptive thresholding algorithm. FIG. 11 illustrates the corresponding image thus segmented and therefore reveals the specular reflection ISR thus determined.

The second sub-step c2 consists in or comprises estimating, from the specular reflection ISR identified in the preceding step, the median position, orthogonally to the longitudinal direction D of the light source 16, of an ideal specular reflection of the light source 16 in the image, corresponding to the median position of such a specular reflection in the absence of any dent in the surface 30.

Figure 12:
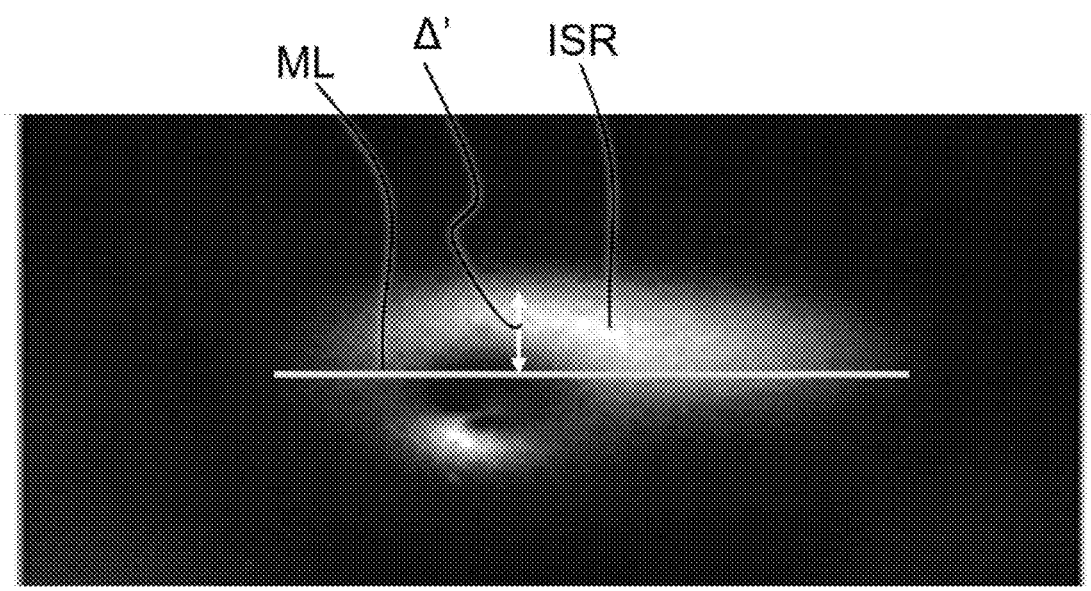
FIG. 12 is a view similar to FIG. 11, illustrating another step of the method.

To this end, the data processing device 18 determines, for example using linear regression, a median line ML of the specular reflection ISR that is oriented parallel to the longitudinal direction D of the light source 16 (FIG. 12). Such a line can be likened to the median position of the ideal specular reflection of the light source 16 when any dents 32 liable to affect the surface 30 are small in size by comparison with the longitudinal extent $L_{SR}$ of the specular reflection SR, on the surface 30, of the light source 16 (FIGS. 5, 8 and 9).

The third sub-step c3 consists in or comprises determining a distance $R_c$ between the flying drone 12 and the surface 30. More specifically, the distance $R_c$ is defined between an optical center OC of the image acquisition device 14 and the surface 30 (namely the distance between the optical center OC and the point of the surface 30 that is situated the closest to the optical center OC).

Figure 6:
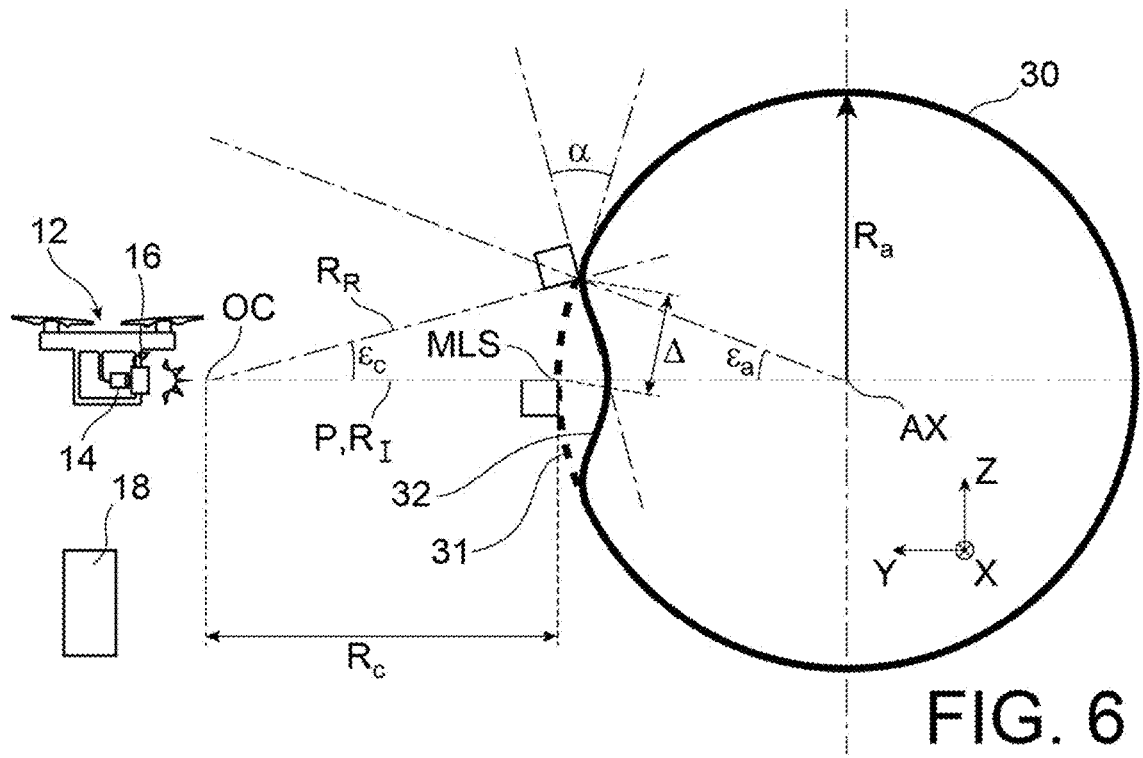
FIG. 6 is a schematic view in cross section of the surface of FIG. 4 and of the system of FIG. 1, during the implementation of the step of the method corresponding to FIG. 5.

To that end, the data processing device 18 determines an apparent longitudinal extent $L_{ISR}$ of the specular reflection ISR of the light source 16 in the image (FIG. 11) and from this deduces a distance $R_c$ between the flying drone 12 and the surface 30 (FIG. 6). With reference to FIGS. 8 and 9, the longitudinal extent $L_{SR}$ of the origin SR, on the surface 30 of the specular reflection ISR of the light source 16, is deduced from the longitudinal extent $L_{LS}$ of the light source 16 using simple considerations of a geometric nature. What is meant by "origin of the specular reflection off the surface 30" is simply the points of the surface 30 from which the light rays that have formed the specular reflection ISR in the image have originated.

In the example illustrated, in which the image acquisition device 14 comprises a single camera centered with respect to the light source 16, the longitudinal extent $L_{SR}$ of the origin SR, on the surface 30, of the specular reflection ISR, is equal to half the longitudinal extent $L_{LS}$ of the light source 16. Knowing the longitudinal extent $L_{SR}$ of the origin SR of the specular reflection ISR on the surface 30, and the intrinsic characteristics of the image acquisition device 14, such as the focal length, the position of the optical center OC (FIG. 7), and distortion parameters if any, the previously determined apparent longitudinal extent $L_{ISR}$ of the specular reflection ISR of the light source 16 in the image can be used to deduce the distance $R_c$ between the flying drone 12 and the surface 30.

The third sub-step c3 can be performed before, during or after implementation of the second sub-step c2.

The fourth sub-step c4 consists in or comprises determining the position, on the surface 30, of each point of the origin SR of the specular reflection ISR of the light source 16 in the image.

In the embodiment illustrated, this sub-step c4 is implemented in a way that will be described hereinafter with more particular reference to FIG. 7.

From starting data that are the estimated median position of the ideal specular reflection in the image, corresponding to the line ML in the example illustrated, the distance $R_c$ between the flying drone 12 and the surface 30, and characteristics of the image acquisition devices 14 (focal length, dimensions of the photosites, position of the optical center OC, etc.), the data processing device 18 determines the angle γ between the optical axis 40 of the image acquisition device 14 and a plane P defined as being the plane that passes through the optical center OC of the image acquisition device and which contains a median position of an origin of the ideal specular reflection of the light source 16 on an ideal surface 31 corresponding to the shape that the surface 30 would have if free of dents. By definition, the origin of the ideal specular reflection is coincident with the origin SR of the specular reflection ISR of the light source 16 in any dent-free part of the surface 30.

Figure 7:
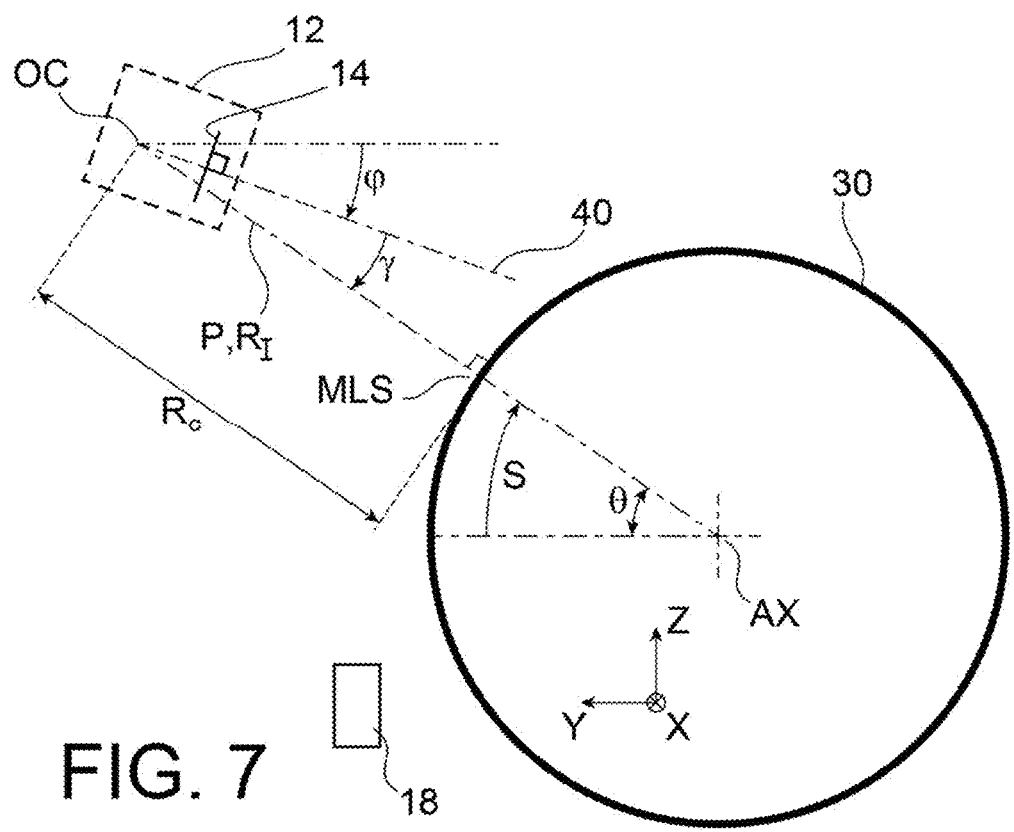
FIG. 7 is a view similar to FIG. 6.

The plane P therefore comprises the virtual rays of light R that would form the specular reflection of the light source 16 received by the device 14 if the surface 30 were free of deformation (FIG. 7). In any dent-free part of the surface 30, these rays of light $R_I$ are oriented in a plane P substantially normal to the surface 30 when the distance between the optical axis 40 of the image acquisition device 14 and a mean longitudinal axis of the light source 16 remains negligible in comparison with the distance $R_c$ between the flying drone 12 and the surface 30.

Furthermore, the orientation φ of the optical axis 40 with respect to a horizontal plane (X, Y) is determined by a gyroscope or equivalent device with which the flying drone 12 is equipped.

By summing the angle γ between the optical axis 40 and the plane P containing the virtual rays of light $R_I$ with the inclination φ of the optical axis 40, the data processing device 18 determines the corresponding angle θ, and from it deduces the abscissa value s for the median position of the origin of the ideal specular reflection off the surface 30, using the bijective relationship between θ and s.

The data processing device 18 may deduce therefrom the position of all of the points of the image on the surface 30 and from that in particular deduce the position, on the surface 30, of the origin of each point of the specular reflection ISR of the light source 16 in the image. Thus, the data processing device establishes a correspondence between each point of the image and each point of the corresponding portion of the surface 30.

The fifth sub-step c5 consists in or comprises estimating a local gradient of the surface 30 at each point of the specular reflection SR seen by the image acquisition device 14, at least from an estimate of any distance there might be between each point of the specular reflection ISR of the light source 16 in the image and the median position of the ideal specular reflection, corresponding to the line ML.

With reference to FIG. 6, implementation of sub-step c5 relies on the following reflection model: the surface 30 being approximated by a cylinder of revolution as explained hereinabove, $R_a$ denotes the local curvature of the surface 30 in a given plane of section, and it is recalled that $R_c$ denotes the distance between the flying drone 12 and the surface 30. The angle $\alpha$ denotes the angle between the surface 30 (possibly dented) and the ideal (dent-free) surface. The angle $\varepsilon_c$ is the angle between a real ray of light $R_R$ produced by the specular reflection SR seen by the image acquisition device 14, in the plane of section concerned, when there is a dent 32 in the surface 30, and an ideal ray of light $R_I$ that the specular reflection seen by the image acquisition device 14 would produce, in the plane of section concerned, if the dent were not present. This latter ray is oriented in the plane P substantially normal to the ideal surface 31 (corresponding to the shape that the surface 30 would have without the dent 32) as explained hereinabove. The distance $\Delta$ is defined as being the point on the surface 30 from which the real ray of light $R_R$ originates, and the point on the ideal surface 31 from which the ideal ray of light $R_I$ originates.

The width of the light source 16 (orthogonally to its longitudinal direction D) and any orange-peel effect there might be on the surface 30 are modelled together by distribution of orientations $\Omega$ around a mean angle $\beta$. It may be readily demonstrated that:

$$\alpha = \beta + \Omega = \epsilon_a + \varepsilon_c = \Delta \times \left(\frac{1}{R_a} + \frac{1}{R_c}\right)$$

The deviation $\Omega$ induced by the width of the light source 16 and by any orange peel effect there might be, can be considered as being bounded:

$$\Omega \in [-\Omega_{max}; +\Omega_{max}]$$

It should be noted that in the case of a surface 30 in the form of a cylinder of revolution or a shape that can be approximated to a cylinder of revolution (disregarding any dents there might be), and of a light source 16 that is longilinear and substantially parallel to the axis of revolution AX, the distortion of the specular reflection is dependent, in the first order, only on the angle $\alpha$, whereas the inclination of the surface 30 in the direction X of the axis AX takes effect only in the second order.

The data processing device 18 determines an estimate of the maximum deviation $\Omega_{max}$ by estimating the width of the ideal specular reflection of the light source 16 in the image (which corresponds to the specular reflection that would be perceived in the absence of dents in the surface 30). To this end, the data processing device 18 determines the median width $I_{ISR-CO}$ of the greatest connected portion ISR-CO of the specular reflection ISR of the light source 16 in the image (FIG. 11). Because this median width $I_{ISR-CO}$ is considered to be an estimate of the width of the ideal specular reflection, the data processing device uses it to deduce the estimate of the maximum deviation $\Omega_{max}$, which is equal to the median width $I_{ISR-CO}$ divided by twice the distance $R_c$ between the flying drone 12 and the surface 30.

Finally, the data processing device 18 estimates any distance $\Delta$ there might be between each point of the specular reflection ISR of the light source 16 in the image and the median position of the ideal specular reflection, which corresponds to the line ML (FIG. 12).

Figure 13:
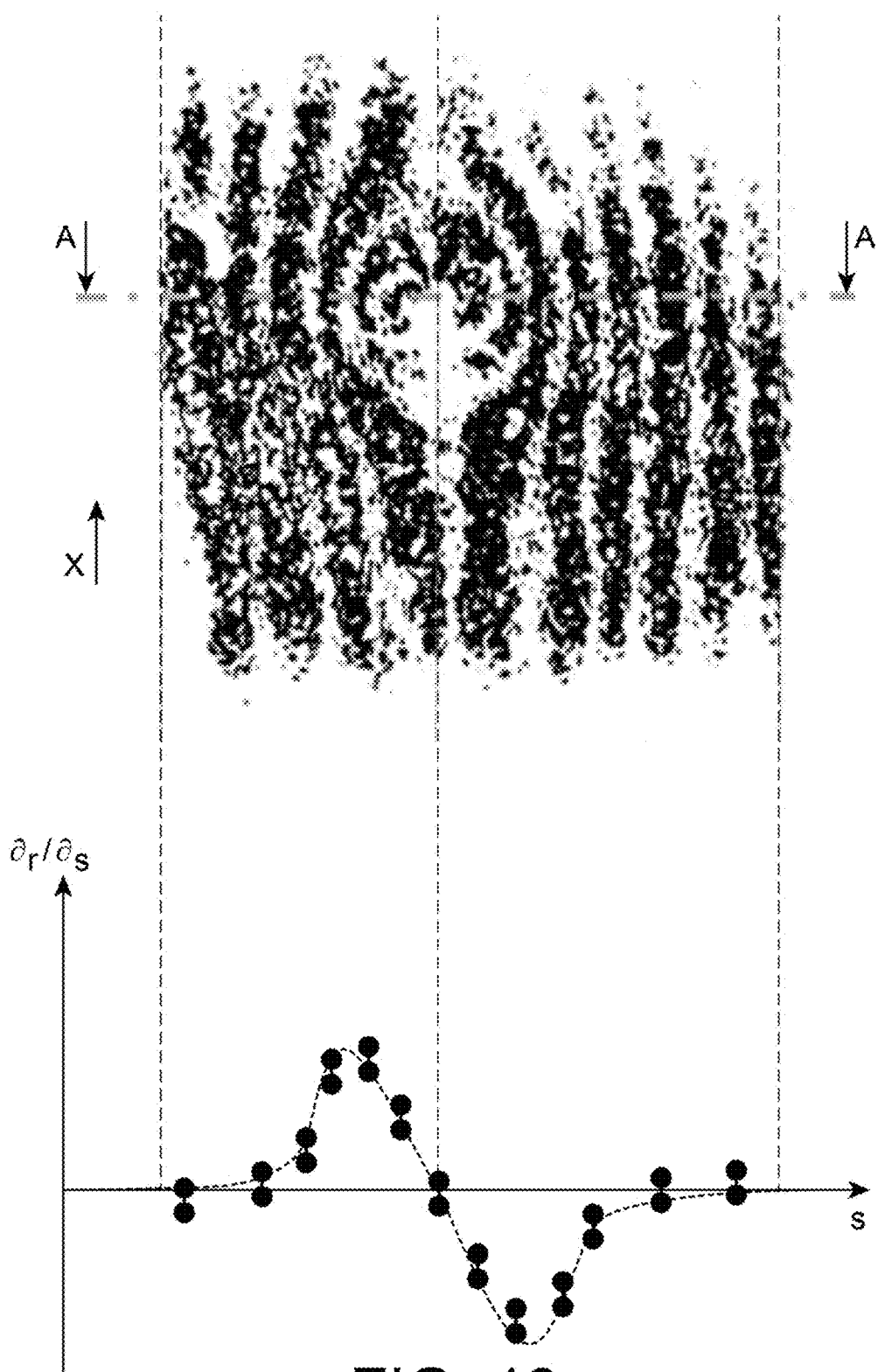
FIG. 13 comprises, in the upper part, a collection of images from the series of images acquired during the step of the method corresponding to FIG. 5, rotated through 90 degrees and, in the lower part, a graph of values of local gradients of the surface as a function of a curved abscissa on the surface in the plane A-A of the upper part of this figure, these gradient values being estimated by the data processing device in the context of a step of the method.

Given that $\Omega \in [-\Omega_{max}; +\Omega_{max}]$ and that $\beta + \Omega = \Delta \times (1/R_a + 1/R_c)$, the data processing device 18 from this deduces a lower boundary $\beta_{min}$ and an upper boundary $\beta_{max}$ for the local gradient $\beta$ of the surface 30, which gradient is equal to the differentiation of the denting of the surface 30 with respect to the curvilinear abscissa value $\beta = \partial r/\partial s$ After step C-I has been implemented for all the images in the series (or each series), the data processing device 18 is in possession of a set of inequations regarding the local gradient $\beta$ of the surface 30 at each point of the surface 30 that has reflected a specular reflection of the light source 16 at least once during the course of the image acquisition step B. By way of illustration, the upper part of FIG. 13 is a collection of images thus acquired, which shows such a collection of points that have reflected a specular reflection of the light source 16, in a given region of the surface 30.

In a subsequent method step C-II, the data processing device 18 relies on the set of estimates of local gradients that have been obtained at the end of step C-I, for at least one region of the surface 30, to estimate the position of any dents there might be in the surface 30.

To this end, in the preferred example illustrated, the data processing device 18 performs an optimization task in order to determine, along different parallel planes of section of the surface, corresponding profiles of the gradient $\partial r/\partial s$ (FIG. 13: lower part) that are compatible with the minimum gradient values $\beta_{min}$ and maximum gradient values $\beta_{max}$ defined in step C-I, while at the same time minimizing a function indicative of the sum of the gradients along each of the planes of section (in terms of absolute value). The optimization performed by the data processing device relates, for example, to the following integral:

$$\int_{s_{min}}^{s_{max}} \left\|\frac{\partial r}{\partial s}\right\|^2 ds$$

Figure 14:
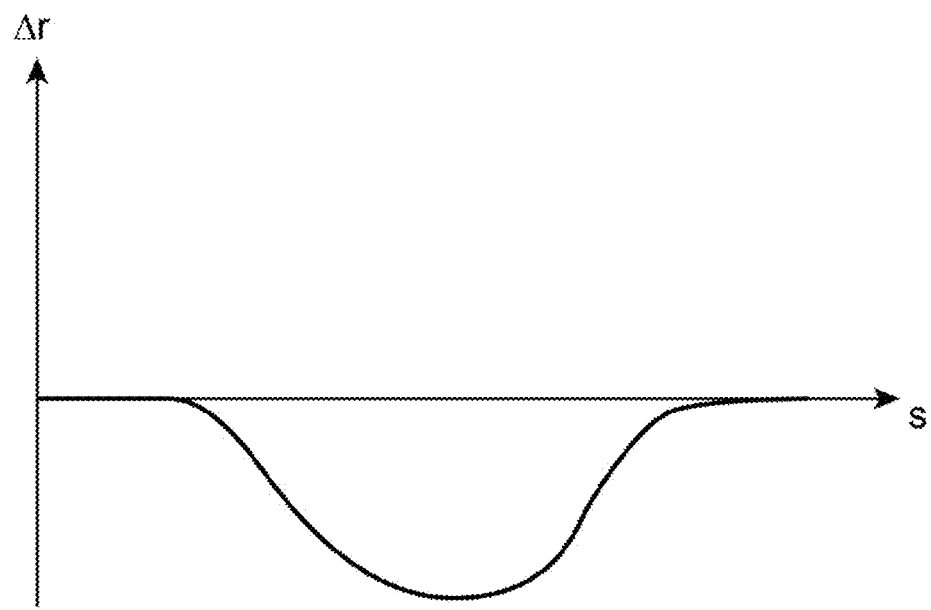
FIG. 14 is a graph of values of dents in the surface as a function of the curved abscissa on the surface in the plane A-A of the upper part of FIG. 13, these dent values being estimated by the data processing device in the context of a step of the method.

Along each of the planes of section concerned, the data processing device 18 determines a corresponding dent profile by calculating the integral of the previously determined local gradients (for example making the assumption of no dent at the end of the integration domain). FIG. 14 illustrates the dents curve $\Delta r$ thus obtained for the plane of section A-A defined in the upper part of FIG. 13.

Figure 15:
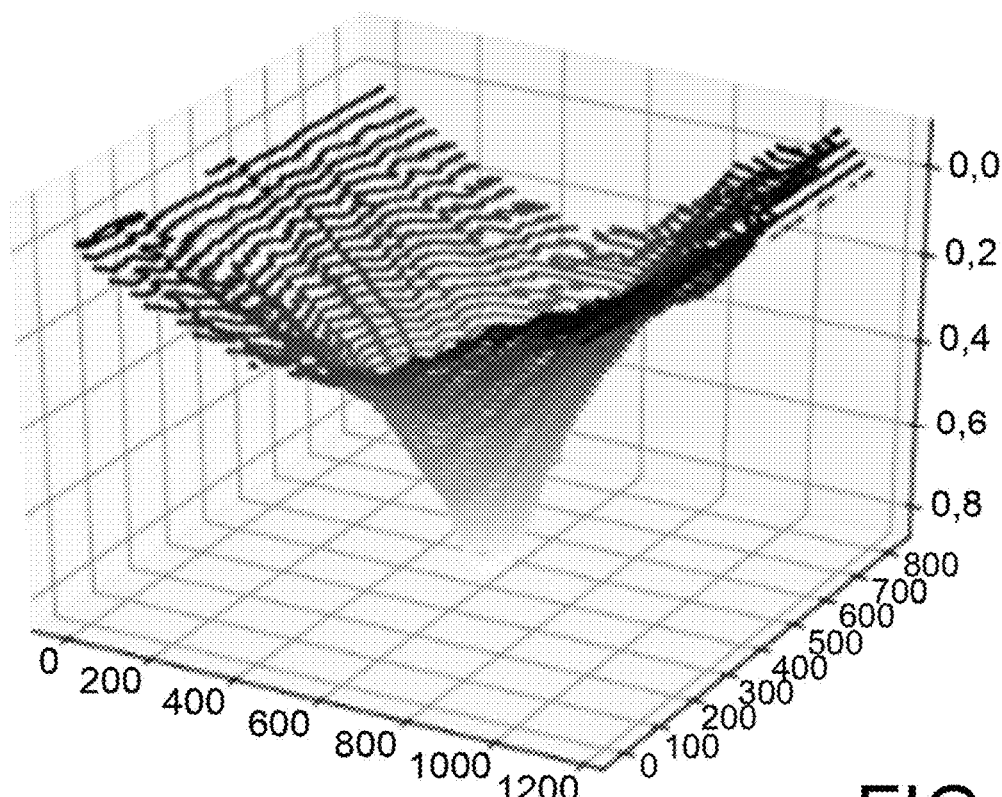
FIG. 15 is a three-dimensional graph illustrating a map of part of the surface reconstructed at the end of the method.

By juxtaposing all of the reconstructed dent profiles on adjacent planes of section, the data processing device 18 determines a map of the depth of the surface 30, or at least part thereof, as illustrated in FIG. 15.

For a given series of images, the number of planes of section considered in step C-II is equal for example to the minimum longitudinal definition (in pixels) of the specular reflection ISR of the light source 16 in the images of the series.

The data processing device applies, for example, spatial filtering so as to reduce or eliminate measurement noise and low frequencies corresponding to large-sized deformations that do not correspond to the dents that are to be detected.

Finally, the data processing device 18 enumerates any dents 32 there might be in the surface 30 by likening any zone of the depth map, corresponding to a depth in excess of a predetermined threshold, to such a dent.

In general, at any stage in the method, a person skilled in the art will appreciate that it may be opportune to apply conventional noise reduction and signal optimization techniques.

A person skilled in the art will also appreciate that the order of certain steps may differ from that described hereinabove. For example, steps B and C-I may be performed in parallel, the data processing device 18 implementing the data processing operations of step C-I for a given plane of section of the surface 30 while a series of images for another plane of section of the surface is being acquired or, within the one same series of images, the data processing device 18 may implement the data processing operations of step C-I for a given image while another image of the series is being acquired.

In addition, as a variant, the flying drone 12 may be equipped with a plurality of image acquisition devices, for example two devices positioned at the opposite ends of the light source 16. Each device thus perceives specular reflections of the light source 16 which are offset along the surface 30 that is to be inspected, which means that the part of the surface analyzed for a journey of the flying drone along a given plane of section is enhanced in comparison with what would be achieved with a single image acquisition device.

Additionally, the flying drone 12 may be equipped with one or more light sources, each longilinear in shape, in order to simultaneously generate a plurality of specular reflections off different parts of the surface to be analyzed.

The trajectory followed by the flying drone in order to acquire one or more series of images may differ from that described hereinabove. In general, it is preferable for the trajectory (or where applicable the first portions of the trajectory) of the flying drone for acquiring a series of images (or each series of images) to be defined according to a plane of greatest curvature of the surface 30 while, where applicable, the second trajectory portions are defined along a plane of lesser curvature of the surface. Thus, in the example illustrated, the planes of section defining the first trajectory portions T1 and T3 are transverse to the surface 30 and are therefore planes in which the surface 30 has a curved (substantially circular) cross section, whereas the second trajectory portions T2 are defined parallel to the axis AX of the surface, in which direction the surface 30 has a zero curvature or smaller curvature.

A person skilled in the art will furthermore appreciate that the frequency of image capture may be adapted according to the desired spatial sampling of the surface 30 along a given plane of section, this sampling rate being dependent on the curvature of the surface and on the dimensions of the dents with which the surface 30 is likely to be affected.

Optionally, the method may comprise a step C-I-bis interposed between step C-I and step C-II, which involves an operator visually identifying one or more dents 32 in the surface 30 in the images acquired in step B and selecting one or more regions of the surface comprising the dent or dents, so that step C-II implemented thereafter by the data processing device 18 concerns itself only with this or these regions. The calculation time required for step C-II can thus be reduced. Such a step C-I-bis may, alternatively, be carried out using an artificial intelligence previously trained to recognise specular reflection deformations characteristic of a dent in the surface.

Furthermore, sub-step c4 described hereinabove is implemented by taking advantage of the bijective nature of the θ(s) function connecting the orientation θ of the local normal n to the surface 30 to the curvilinear abscissa value s on this surface along a given plane of section.

In a variant, sub-step c4 may rely on other methods for realigning the acquired images, on the surface 30, notably methods that do not require the surface 30 to be of a shape such that the aforementioned θ(s) function is a bijective function. To this end, sub-step c4 relies for example on the recognition, in at least some of the acquired images, of patterns existing on the surface 30. In the event that the surface 30 is the exterior surface of an aircraft, such patterns consist, for example, of rows of rivets. As a further variant, sub-step c4 may rely on the emission of a structured light by the light source 16 and the analysis of the reflection of the structures formed by this light on the surface 30.

In the disclosure herein, the images acquired are images of the reflection of the portion of the surface that is illuminated and analyzing the specular reflection of this elongate light source in an acquired image, namely analyzing a reflected pattern, and measuring a gradient making it possible to be sensitive to dents of low depth. In general, the method according to the disclosure herein allows surfaces of very large dimensions, for example several hundred square meters, to be analyzed in a particularly quick, effective and reliable way, without requiring precise prior knowledge of the shape of these surfaces.

The method according to the disclosure herein allows all of the analysis steps C-I, C-II and, where applicable, C-I-bis, to be automated. When the ideal geometry of the surface 30 that is to be inspected is known, at least roughly, the control of the flying drone can be performed entirely or partially in a programmed manner, so that it is also possible for step B of the method to be automated.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for detecting potential dents in a surface able to reflect light, the method comprising at least steps of:
   A) providing a system, which comprises a flying drone, which is equipped with an image acquisition device and at least one light source, and a data processor, wherein a shape of the at least one light source is elongate in a longitudinal direction of the at least one light source;
   B) acquiring, by the image acquisition device, at least one series of images of portions of the surface by moving the flying drone past the surface along a trajectory so that, for each image of the at least one series of images, the at least one light source is illuminating a corresponding portion of the surface; and C) analyzing, using the data processor, a shape of a specular reflection of the at least one light source in all or some of the images of the at least one series of images to estimate a position of any dents in the surface.

2. The method according to claim 1, wherein:

for the series of images or for each series of images, the trajectory of the flying drone is such that an optical axis of the image acquisition device remains in a corresponding plane of section of the surface; and the at least one light source is in an orientation such that the longitudinal direction thereof is secant with a plane of section of the surface.

3. The method according to claim 1, wherein step C comprises steps of:

C-I) for each image of the series of images, operating the data processor to:

c1) identify the specular reflection of the at least one light source in the image;

c2) from the specular reflection identified in sub-step c1, estimate a median position, orthogonally to the longitudinal direction of the at least one light source, of an ideal specular reflection of the at least one light source in the image, corresponding to the median position of such a specular reflection in absence of any dent in the surface;

c3) determine a distance between the flying drone and the surface;

c4) determine the position, on the surface, of each point of an origin of the specular reflection of the at least one light source in the image; and c5) estimate a local gradient of the surface at each point of the origin of the specular reflection, at least from an estimate of any distance there might be between each point of the specular reflection of the at least one light source in the image and an estimated median position of the ideal specular reflection; and C-II) from all of the estimated local gradients obtained at an outcome of step C-I for at least one region of the surface, operating the data processor to estimate the position of any dents there might be in the surface.

4. The method according to claim 3, wherein, in sub-step c3, the data processor determines an apparent longitudinal extent of the specular reflection of the at least one light source in the image, from which the data processor deduces the distance between the flying drone and the surface.

5. The method according to claim 3, wherein sub-step c4 comprises operating the data processor to:

determine, from the estimated median position of the ideal specular reflection in the image, an angle between an optical axis of the image acquisition device and a plane that passes through an optical center of the image acquisition device and which contains a median position of an origin of the ideal specular reflection of the at least one light source off an ideal surface corresponding to a shape that the surface would have if free of dents;

deduce therefrom an orientation, with respect to a reference plane, of a direction normal to the surface at any point of the origin of the specular reflection of the at least one light source in a dent-free zone of the surface; and deduce therefrom a correspondence between each point of the image and each point of a corresponding portion of the surface.

6. The method according to claim 3, wherein, in sub-step c5, the data processor determines a maximum boundary of a parameter representing a cumulative effect of width of the at least one light source and of a potential orange peel effect inherent to the surface on the specular reflection of the at least one light source in the image from an estimate, made by the data processor, of a width of the ideal specular reflection of the at least one light source in the image.

7. The method according to claim 3, in which step C-II comprises operating the data processor to determine, along different planes of section of the surface, corresponding profiles of the local gradient which are compatible with the estimated local gradient obtained in step C, while at a same time minimizing a function indicative of a sum of absolute values of the local gradients along each of the planes of section.

8. The method according to claim 7, wherein step C-II subsequently comprises operating the data processor to determine a dent profile by calculating, along each of the different planes of section of the surface, an integral of the previously determined corresponding profile of the local gradient.

9. The method according to claim 8, wherein step C-II subsequently comprises operating the data processor to form a map of depth of at least part of the surface from the dent profiles previously determined for the different planes of section of the surface, and then to identify any zones with a depth greater than a predetermined threshold as dents in the surface.

10. The method according to claim 3, wherein step C subsequently comprises a step C-I-bis interposed between step C-I and step C-II, which comprises an operator or an artificial intelligence visually identifying one or more dents in the surface in the images acquired in step B and selecting one or more regions of the surface comprising the one or more dents, and wherein step C-II concerns itself only with these one or more regions.

11. A system for detecting potential dents in a surface able to reflect light, the system comprising:

a flying drone comprising an image acquisition device and at least one light source, wherein a shape of the at least one light source is elongate in a longitudinal direction of the light source; and a data processor configured to analyze a shape of a specular reflection of the at least one light source in all or some of images of a series of images to estimate a position of any dents in the surface.

12. The system according to claim 11, wherein the at least one light source has a longitudinal extent greater than a span of an assembly made up of the flying drone apart from the at least one light source and/or at least one-and-a-half times a maximum separation between rotors of the flying drone.

13. A computer program product comprising program code instructions which, when executed by a data processor of the system according to claim 11 provided with a series of images of portions of a surface able to reflect light which have been acquired by moving the flying drone past the surface along a trajectory so that, for each image of the series, the at least one light source is illuminating a corresponding portion of the surface, result in the data processor analyzing a shape of a specular reflection of the at least one light source in all or some of the images of the series of images to estimate a position of any dents in the surface.

* * * * *